United States Patent [19]  [11] Patent Number: 4,472,588
Keasey  [45] Date of Patent: Sep. 18, 1984

[54] PRODUCTION OF POLYALKENYL SUCCINIC ANHYDRIDES

[75] Inventor: Alan Keasey, Hull, England

[73] Assignee: BP Chemicals Limited, London, England

[21] Appl. No.: 441,262

[22] Filed: Nov. 12, 1982

[30] Foreign Application Priority Data

Nov. 25, 1981 [GB] United Kingdom ............... 8135495

[51] Int. Cl.³ .......................................... C07D 307/60
[52] U.S. Cl. ................................................... 549/255
[58] Field of Search ........................................ 549/255

[56] References Cited

U.S. PATENT DOCUMENTS 3,346,354 10/1967 Kautsky et al. ........................ 44/63
3,855,251 12/1974 Cahill .................................. 549/255
4,282,157 8/1981 Van der Voort ................... 549/255

FOREIGN PATENT DOCUMENTS 2081274 2/1982 United Kingdom .

Primary Examiner—Henry R. Jiles
Assistant Examiner—Bernard Dentz
Attorney, Agent, or Firm—Brooks, Haidt, Haffner & Delahunty

[57] ABSTRACT

This invention relates to a process for producing polyalkenyl succinic anhydrides by reacting with continuous agitation a polyalkylene having a number average molecular weight of between 300 and 50,000 with maleic anhydride in a molar ratio of between 0.5:1 and 20:1 and at a temperature between 200° and 250° C. The feature of the process is that the maleic anhydride is added incrementally to the polybutene at such a rate that a single, homogeneous phase is maintained in the reactor throughout the duration of the reaction and the addition of maleic anhydride reactant is completed within 75% of the duration required to achieve maximum conversion of the polyalkylene of a given molecular weight. The polyalkylene derivative may for example be a polypropylene, a polybutene, a polyiso-butene or a polymer of 4-methyl pentene-1. By carrying out the reaction under these conditions the process results in a reduced amount of resin formed and enables more efficient use of maleic anhydride.

8 Claims, No Drawings

PRODUCTION OF POLYALKENYL SUCCINIC ANHYDRIDES

Polyalkenyl succinic anhydrides are produced in large quantities as intermediates for making polyalkenyl succinimide lubricating oil dispersant additives. These additives are prepared by chemical reaction of low molecular weight polyolefins at the terminal olefin groups with maleic anhydride. One of the most common additives is formed by reaction of polyisobutene with maleic anhydride to give polyisobutenyl succinic anhydride (PIBSA), followed by reaction with a polyamine to give a polyisobutenyl succinimide.

Polyisobutenes are produced by polymerisation of either pure isobutene or a mixed $C_4$ stream and can be either pure poly(isobutene) or copolymers of isobutene with linear butenes. Such copolymers are included within the term polyisobutenes for the purposes of the present invention. The number average molecular weight of the most commonly used polyisobutenes ranges from 700–1500, but polyisobutenyl succinimides can be prepared from polyisobutenes of any molecular weight. Polyalkenyl succinimides can also be prepared from other polyolefins, e.g. polypropylene, poly(butene-1), poly(butene-2) and poly 4-methyl pentene-1.

Generally the reaction between polyisobutene and maleic anhydride is carried out by heating the two reagents in the absence of a catalyst at about 200°–250° C. for a period of from 2 to 30 hours. Conventionally, the reaction is carried out by a single addition of maleic anhydride at a temperature of between 210° and 215° C. at atmospheric pressure or at around 240° C. at elevated pressures. Under these conditions maleic anhydride is present as a distinct and separate phase during the initial stages of the reaction. This encourages the formation of undesirable and difficulty removable resinous by-products under the relatively high temperatures used. Moreover, a single addition of the maleic anhydride reactant reduces the flexibility of the process in that reaction temperatures above 215° C. cannot be used in the initial stages of the reaction at atmospheric pressure due to the high volatility of maleic anhydride. Under these conditions the level of conversion achieved with the more commonly used polyalkylenes of number average molecular weight of 700–1500 is only around 60–75% and usually a large excess of maleic anhydride is needed to achieve such conversions.

A number of additives have been claimed to reduce the level of resinous by-products but the contamination of the desired polyalkenyl succinic anhydride product by resins remains a significant problem.

In U.S. Pat. No. 3,346,354 it is suggested that the reaction between polyisobutene and maleic anhydride be carried out by dropwise addition of 2 moles of the latter into the former at 240° C. over 6 hours which is the duration of the entire reaction for converting 80% of the polybutene reactant. This expedient solves the problems of heterogeneous phase and also alleviates to a certain extent the resin formation. However, the slow addition of maleic anhydride throughout the duration of the reaction gives rise to a cloudy and hazy product. The cloudiness is due to the formation of resin fines which are equally undesirable in that it is difficult to remove the fines by filtration. Moreover, the presence of such fines has a deleterious effect on the subsequent reaction of the polyalkenyl succinic anhydrides, eg in forming the imides and the subsequent use thereof as oil additives.

It is the object of the present invention to provide an improved process for producing polyalkenyl succinic anhydrides wherein, during the reaction of polyalkenes with maleic anhydride, the amount of resin and resin fines formed is reduced.

Accordingly, the present invention is a process for producing polyalkenyl succinic anhydrides by reacting with continuous agitation a polyalkylene having a number average molecular weight of between 300 and 50,000 with maleic anhydride in a molar ratio of between 0.5:1 and 20:1 and at a temperature between 200° and 250° C., characterised in that the maleic anhydride is added incrementally to the polyalkylene at such a rate that (a) substantially a single, homogeneous phase is maintained in the reactor throughout the duration of the reaction and (b) the addition of maleic anhydride reactant is completed within 75% of the duration required to achieve maximum conversion of the polyalkylene of a given molecular weight under a given set of reaction conditions.

The polyalkylene may for example be a polypropylene, a polybutene, a polyisobutene or a polymer of 4-methyl pentene-1. The polyalkylene suitably has a number average molecular weight of between 300 and 50,000, preferably between 700 and 1,500. The polyalkylene is most preferably a polyisobutene.

The reaction is suitably carried out at a temperature between 210° and 240° C. Although the reaction will proceed satisfactorily at atmospheric pressure, it is preferable to use moderately elevated pressures of up to 2 bar for the higher temperatures within this range.

The relative molar ratios of maleic anhydride to the polyalkylene reactant is suitably between 1:1 and 3:1, preferably between 1:1 and 2:1.

It will be apparent to those skilled in the art that the maximum conversion achievable and the duration for this conversion will depend upon (i) the type and molecular weight of the polyalkylene and (ii) the reaction temperature and pressure used. However, for any given set of values for (i) and (ii) above the maximum conversion achievable and the duration therefor fall within narrow ranges. Taking polyisobutenes as an example, Table 1 below illustrates the variation of maximum conversion with molecular weight of the polymer and also the duration required to achieve the conversion under the given conditions. The object of the present invention is to add incrementally the maleic anhydride reactant to the polyalkylene at such a rate that (a) the reaction is carried out in a single homogeneous phase and (b) the addition of maleic anhydride is completed within 75%, preferably within 50% of the duration required to achieve maximum conversion. That is, if 50% w/w conversion is the maximum achievable and it is expected to take eg 10 hours, the total maleic anhydride reactant is added within 7.5 hours. During the addition of maleic anhydride and throughout the reaction it is preferable to continuously agitate the reaction mixture. It has been found that by keeping the degree and severity of agitation to a minimum it is possible to achieve a product which is readily filtered and contains an extremely low level of resin fines without sacrificing the rate and extent of conversion. Upon completion of the addition of maleic anhydride, the reactants should be maintained at the reaction temperature and pressure for the remainder of the duration required to ensure completion of the reaction. Thereafter, the products, including the polyalkenyl succinic anhydride, may be recovered from the reaction mixture by conventional techniques.

By adding the maleic anhydride to the polyalkylene in the manner stated above the amount of resin formed in general and the level of resin fines formed in particular during the reaction are reduced. This greatly reduces the problems associated with filtration of resin from the product and the clarity of the final PIBSA product.

The process of the present invention is further illustrated with reference to the following examples.

EXAMPLES 1 AND 2

Incremental Addition

Polyisobutene (50 g), having an number average molecular weight (Mn) of 1000 was charged to a cylindrical glass reactor equipped with a mechanical stirrer and immersed in a constant temperature oil-bath. The polyisobutene was stirred under nitrogen atmosphere whilst the desired temperature was achieved. Maleic anhydric was then charged incrementally over an initial 12 h period (0.5 g/½ h for 5½ and then 3.8 g over a 6 h period) and the reaction stirred for a further 12 h period to ensure a substantially complete degree of conversion.

Unreacted maleic anhydride was removed from the product by vacuum distillation at 180° C./5 mm Hg and, after dilution with an equal volume of petroleum spirit, the product was filtered through a sintered glass plate to remove the resinous by-product. The level of resin fines in the filtered PIBSA was determined by naphtha dilution and deposition by centrifuge whilst, after solvent removal, the PIBSA product was analysed for degree of conversion and PIBSA Number (as mg KOH.g$^{-1}$). The results are shown in Table 2.

COMPARATIVE TESTS A AND B (not according to the invention)

Single Addition

The procedure of Examples 1 and 2 was repeated except that the maleic anhydride (9.8 g) was added as a single charge at the start of the reaction period. These results are shown in Table 2 for comparison.

EXAMPLES 3 TO 6

The reactions were carried out with 0.25 moles of polyisobutene (Mn=1000) in a 3-neck, 500 ml flask equipped with a reflux condenser, a thermometer and a mechanical stirrer. The maleic anhydride was charged at a steady rate over the initial 3 h reaction period.

Product recovery was as described previously in Examples 1 and 2 and the results are shown in Table 3.

COMPARATIVE TEST C (not according to the present invention )

Incremental Addition at 240° C.

This was carried out in the same manner as in Examples 3 to 6 above except that the maleic anhydride was added at a steady rate through out the entire 6 hour reaction period. The results are shown in Table 3.

EXAMPLES 7/8 AND COMPARATIVE TEST D

Incremental Addition at 230° C.

The reactions were carried out as described in Examples 3 to 6 above with 0.2 moles of polyisobutene (Mn=1000) except that in the Examples illustrating the present invention, the maleic anhydride was added at a steady rate over the initial 6 hours of a 12 hour reaction period. In Comparative Test D, the maleic anhydride was added at a steady rate throughout the 12 hour reaction period.

Product recovery was as described previously in Examples 1 and 2, and the experimental results are shown in Table 4.

TABLE 1

The Relation between Molecular Weight and Conversion in the Thermal Reactions of Polyisobutene with Maleic Anhydride in stirred Reactions at 210/215° C.* and 1 bar pressure

| Molecular Weight (Number average) | Time to maximum Polyisobutene Conv. (h) | Polyisobutene Conv. at 24 h (% wt) | PIBSA Number (mgKOH · g$^{-1}$) |
|---|---|---|---|
| 300 | 10 | 93 | 240 |
| 780 | 20 | 70 | 110 |
| 1000 | 24 | 70 | 90 |
| 1300 | 26 | 64 | 68 |
| 5800** | 30 | 46 | 8 |
| 14000 | More than 36 | 25 | 3 |

Notes:
*At 230/240° C. the time for maximum conversion can be reduced by approximately half.
**The typical molar ratio of MA to PIB of 2 to 1 is increased for high molecular weight polymers to between 10 and 20 to 1.

TABLE 2

The Reaction of Maleic Anhydride (MA) with Polyisobutene (2:1 molar ratio) in a stirred reactor for 24 h at 1 bar pressure

| Example or Comp. Test | Reaction Conditions | | Results | | | |
|---|---|---|---|---|---|---|
| | Temp. °C. | Mode of MA Addition | Conversion % wt | PIBSA Number mgKOH · g$^{-1}$ | Recovered Resin Total % wt | Fines % vol |
| Test A | 210 | single | 67 | 82 | 2.5 | 0.008 |
| Ex. 1 | 210 | incremental | 66 | 82 | 1.1 | 0.002 |
| Test B | 215 | single | 71 | 89 | 3.5 | 0.008 |

TABLE 2-continued

The Reaction of Maleic Anhydride (MA) with Polyisobutene (2:1 molar ratio) in a stirred reactor for 24 h at 1 bar pressure

| Example or Comp. Test | Reaction Conditions | | Results | | | |
|---|---|---|---|---|---|---|
| | Temp. °C. | Mode of MA Addition | Conversion % wt | PIBSA Number mgKOH·g$^{-1}$ | Recovered Resin | |
| | | | | | Total % wt | Fines % vol |
| Ex. 2 | 215 | incremental | 71 | 91 | 0.7 | 0.002 |

Notes:
1. In the incremental addition process, the total MA charge was added portionwise over the initial 12 h period.
2. The level of resin fines was determined by mixing 1 part of the filtered PIBSA product with 3 parts of naphtha and then depositing the resin fines by centrifuge to allow direct reading in a graduated tube.

TABLE 3

The Incremental Addition of Maleic Anhydride (MA) to Polyisobutene (PIB) in a stirred Reactor at 240° C. and 1 bar pressure

| Example or Comp. Test | Reaction Conditions | | | Results | | | |
|---|---|---|---|---|---|---|---|
| | MA Addn | | | | PIBSA | Recovered Resin | |
| | Duration h | Time h | MA:PIB molar | Conversion % wt | Number mgKOH·g$^{-1}$ | Total % wt | Fines % vol |
| Ex. 3 | 6 | 3 | 1:1 | 58 | 74 | 1.1 | 0.008 |
| Ex. 4 | 12 | 3 | 1:1 | 61 | 77 | 1.0 | 0.010 |
| Ex. 5 | 6 | 3 | 1.5:1 | 64 | 86 | 1.3 | 0.010 |
| Ex. 6 | 12 | 3 | 1.5:1 | 69 | 92 | 2.7 | 0.006 |
| Test C | 6 | 6 | 1.5:1 | 64 | 81 | 1.3 | 0.020 |

Notes
In Comparative Test C, it was intended to follow the procedure given in U.S. Pat. No. 3,346,354 but it was found impossible to add two moles of maleic anhydride within a 6 h period whilst maintaining a temperature of 240° C. at atmospheric pressure.

TABLE 4

The Incremental Addition of Maleic Anhydride (MA) to Polyisobutene (PIB) in a stirred reactor for 12 h at 230° C./1 bar pressure

| Example or Comp. Test | Reaction Conditions | | Results | | | |
|---|---|---|---|---|---|---|
| | MA Addition period h | MA:PIB moles | Conversion % wt | PIBSA Number mgKOH·g$^{-1}$ | Recovered Resin | |
| | | | | | Total % wt | Fines % vol |
| Ex. 7 | 6 | 1:1 | 70 | 90 | 1.5 | 0.008 |
| Ex. 8 | 6 | 1.5:1 | 72 | 100 | 1.7 | 0.008 |
| Test D | 12 | 1.5:1 | 63 | 81 | 1.6 | 0.016 |

Notes:
In Comparative Test D, product filtration was extremely slow and in spite of centrifuging, the solution remained cloudy.

I claim:

1. A process for producing polyalkenyl succinic anhydrides by reacting with continuous agitation a polyalkylene having a number average molecular weight of between 300 and 50,000 with maleic anhydride in a molar ratio of between 0.5:1 and 20:1 and at a temperature between 200° and 250° C., characterised in that the maleic anhydride is added incrementally to the polyalkylene at such a rate that
   (a) substantially a single, homogeneous phase is maintained in the reactor throughout the duration of the reaction and
   (b) the addition of maleic anhydric reactant is completed within 75% of the duration required to achieve maximum conversion of the polyalkylene of a given molecular weight under a given set of reaction conditions;
   and, after completion of the addition of maleic anhydride, the reaction temperature is maintained to insure completion of the reaction.

2. A process according to claim 1 wherein the polyalkylene is a polypropylene, a polybutene, a polyisobutene or a polymer of 4-methyl pentene-1.

3. A process according to claim 1 wherein the polyalkylene has a number average molecular weight of between 700 and 1,500.

4. A process according to claim 1 wherein the reaction is carried out at a temperature between 210° and 240° C.

5. A process according to claim 1 wherein the relative molar ratios of maleic anhydride to the polyalkylene reactant is between 1:1 and 3:1.

6. A process according to claim 1 wherein the maleic anhydride reactant is added incrementally to the polyalkylene at such a rate that the addition is completed within 50% of the duration required to achieve maximum conversion.

7. A process according to claim 1, wherein the polyalkylene is a polypropylene, a polyisobutene or a polymer of 4-methyl pentene-1.

8. A process according to claim 1, wherein the polyalkylene is a polyisobutene.

* * * * *

UNITED STATES PATENT AND TRADEMARK OFFICE
CERTIFICATE OF CORRECTION

PATENT NO. : 4,472,588
DATED : September 18, 1984
INVENTOR(S) : ALAN KEASEY

It is certified that error appears in the above-identified patent and that said Letters Patent is hereby corrected as shown below:

Col. 1, line 37, "difficulty" should read --difficultly--

Col. 2, line 45, "fail" should read --fall--

Col. 3, line 24, "anhydric" should read --anhydride--

Col. 3, line 25, "5½" should read --5½ h--

Claim 1, line 58, "anhydric" should read --anhydride--

Signed and Sealed this

Nineteenth Day of February 1985

[SEAL]

Attest:

DONALD J. QUIGG

Attesting Officer     Acting Commissioner of Patents and Trademarks